US006515841B1

(12) United States Patent
Doi

(10) Patent No.: US 6,515,841 B1
(45) Date of Patent: Feb. 4, 2003

(54) HIGH VOLTAGE POWER SUPPLY APPARATUS

(75) Inventor: Koji Doi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/425,226

(22) Filed: Oct. 22, 1999

(30) Foreign Application Priority Data

Oct. 27, 1998 (JP) ........................................... 10-304833

(51) Int. Cl.$^{7}$ ........................... H02H 3/00; H01H 73/00

(52) U.S. Cl. ....................... 361/115; 361/93.1; 361/100

(58) Field of Search ................................ 361/100, 93.1, 361/115

(56) References Cited

U.S. PATENT DOCUMENTS 5,297,014 A * 3/1994 Saito et al. ................ 361/93.1
5,510,753 A * 4/1996 French ....................... 330/146
5,530,321 A * 6/1996 Sears ......................... 315/283

* cited by examiner

*Primary Examiner*—Stephen W. Jackson
(74) *Attorney, Agent, or Firm*—Fitzpatrick, Cella, Harper & Scinto

(57) ABSTRACT

In the electrophotographic copying apparatus or printer, a current proportional to the output current of the high voltage output circuit for supplying the charger etc. with a high voltage is detected by a current detection circuit, and the detection output is supplied to a smoothing circuit and a peak hold circuit. The outputs of the smoothing circuit and the peak hold circuit are supplied to a comparator and are compared with a reference value. If the output of the smoothing circuit or the peak hold circuit exceeds the reference value, the output of the high voltage output circuit is lowered or terminated.

19 Claims, 4 Drawing Sheets

HIGH VOLTAGE POWER SUPPLY APPARATUS

BACKGROUND OF THE INVENTION

1. Field of the Invention

The present invention relates to a high voltage power supply apparatus for providing a high-voltage current for use, for example, in a copying apparatus or a printer of electrophotographic system.

2. Related Background Art

The electrophotographic copying apparatus or printer employs a high voltage power supply apparatus for the image forming process. Such a high voltage power supply apparatus is designed so as to lower or terminate the high voltage output upon detecting an abnormal current, in case of an abnormality such as a current leakage in a process unit such as a charger or a photosensitive drum constituting the load of the power supply apparatus.

In such a conventional high voltage power supply apparatus, however, the abnormality is detected only for an instantaneous increase in the output current caused, for example, by a leakage, so that an increase of the output current in the average value (or in the effective value) cannot be detected. For this reason, there is encountered a drawback that such a state of the increased output current on average may continue for a long time and may cause damage in the process unit such as the photosensitive drum, thus deteriorating the quality of the copied or printed image relatively quickly.

SUMMARY OF THE INVENTION

An object of the present invention is to provide an image forming apparatus not associated with the above-mentioned drawback.

Another object of the present invention is to provide an image forming apparatus capable of monitoring the abnormality in the output of different frequencies for the same load.

Still another object of the present invention is to provide a high voltage power supply apparatus capable of securely protecting the load to which the high voltage current is supplied.

Other objects and features of the present invention will become apparent from the following description which is to be taken in conjunction with the attached drawings.

DETAILED DESCRIPTION OF THE PREFERRED EMBODIMENTS

The present invention will now be described in detail by preferred embodiments with reference to the attached drawings. In the following there will be shown embodiments of the high voltage power supply apparatus adapted for use in a copying apparatus or a printer of the electrophotographic process.

[First Embodiment]

The first embodiment of the present invention will be explained with reference to FIGS. 1 and 2. At first reference is made to FIG. 1 for explaining the schematic configuration and the function of the high voltage power supply apparatus of the present embodiment.

Figure 1:
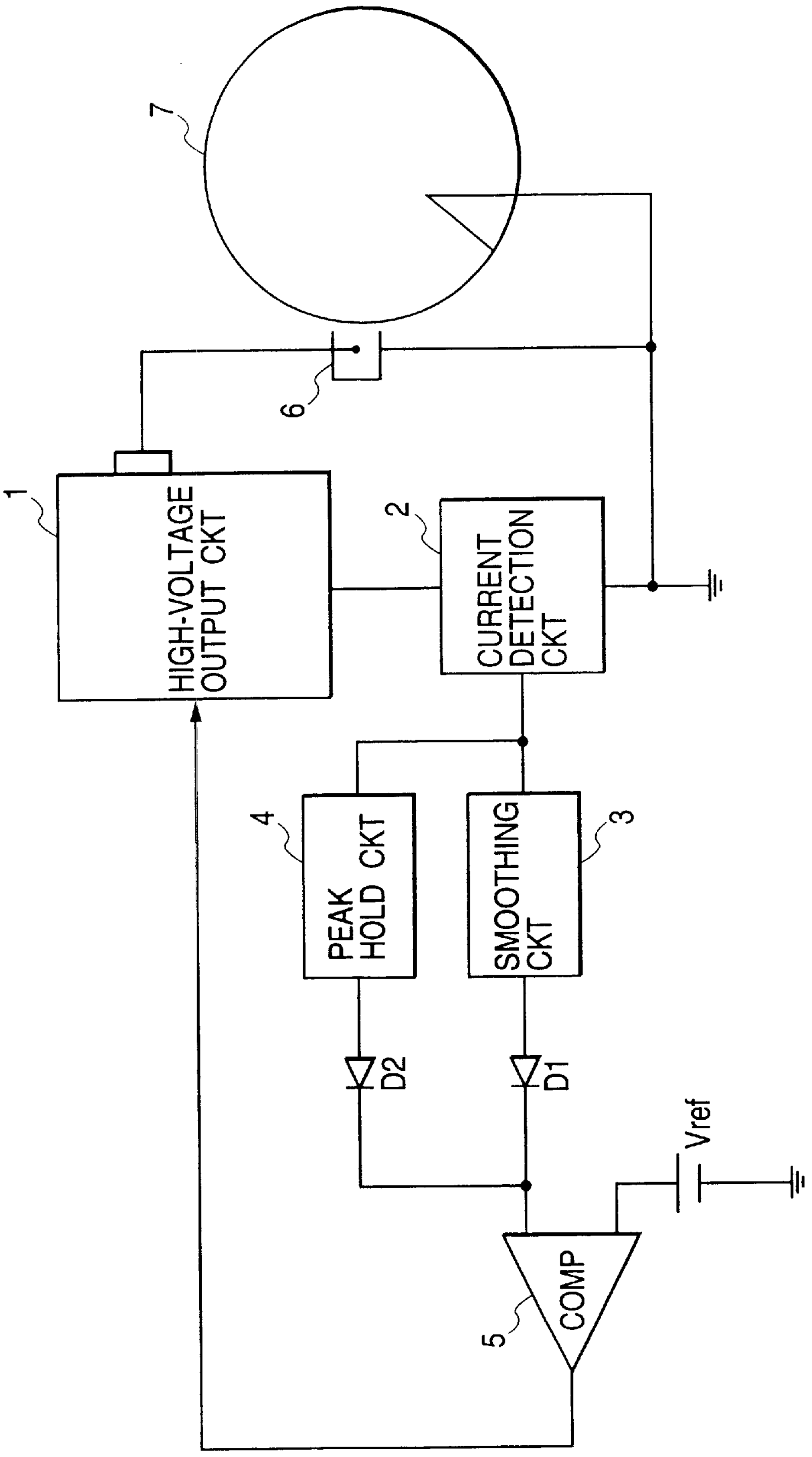
FIG. 1 is a block diagram schematically showing the configuration of the high voltage power supply apparatus constituting a first embodiment of the present invention.

Referring to FIG. 1, there are shown a high voltage output circuit 1 for generating a high voltage output of a constant voltage; a current detecting circuit 2 for detecting the output current of the high voltage output circuit 1 and outputting a signal of a voltage proportional to the above-mentioned output current; a smoothing circuit 3 for smoothing (average) the output signal of the current detection circuit 2; a peak hold circuit 4 for holding the peak voltage value of the output signal of the current detection circuit 2 and outputting a signal of a voltage proportional to such peak voltage value; diodes D1, D2 for OR connection of the outputs of the smoothing circuit 3 and the peak hold circuit 4; and a comparator 5 for comparing the higher one of the output signals of the smoothing circuit 3 and the peak hold circuit 4, which are OR connected by the diodes D1 and D2, with a predetermined reference voltage Vref and providing the high voltage output circuit 1 with a signal indicating the result of such comparison. As will be explained later, the high voltage output circuit 1 executes a protecting operation of lowering or terminating the output according to the output signal of the comparator 5.

There are also shown a charger 6 receiving the high voltage output of the high voltage output circuit 1, and a photosensitive member 7 opposed to the charger 6, both being grounded and connected to the current detection circuit 2.

In the above-described configuration, in the course of the electrophotographic process, the high voltage output circuit 1 applies the high voltage to the charger 6. In response to such high voltage application, a load current reaches the shield of the charger 6 and flows to the photosensitive member 7 as the charging current therefor, and further passes the current detection circuit 2 through the ground. As a result, the current detection circuit 2 detects a current corresponding to the impedance constituted by the charger 6, functioning as the load, and the photosensitive member 7.

In case the impedance of the charger 6 is lowered for example by time-dependent deterioration or smear of the charger 6, the signal voltage detected by the current detection circuit 2 increases in average, whereby the output signal of the smoothing circuit 3 increases in voltage. The output signal of the smoothing circuit 3 is supplied through the diode D1 to the comparator 5, or which output is inverted when the voltage of such input signal exceeds the reference voltage Vref entered into the other input of the comparator 5. The inverted signal is supplied to the high voltage output circuit 1 which in response terminates or lowers the high voltage output.

On the other hand, for example, a charging wire provided in the charger 6 is broken by time-dependent deterioration, the output of the high voltage output circuit 1 leaks for example to the photosensitive member 7 through thus broken wire. In such case, the current detection circuit 2 detects a large current instantaneously or in a relatively short period. The peak voltage value of the detection signal is held by the peak hold circuit 4 and is supplied through the diode D2 to the comparator 5. The output of the comparator 5 is inverted when the inputted peak voltage signal exceeds the aforementioned reference voltage Vref. The inverted signal is supplied to the high voltage output circuit 1 which in response terminates or lowers the high voltage output.

Figure 2:
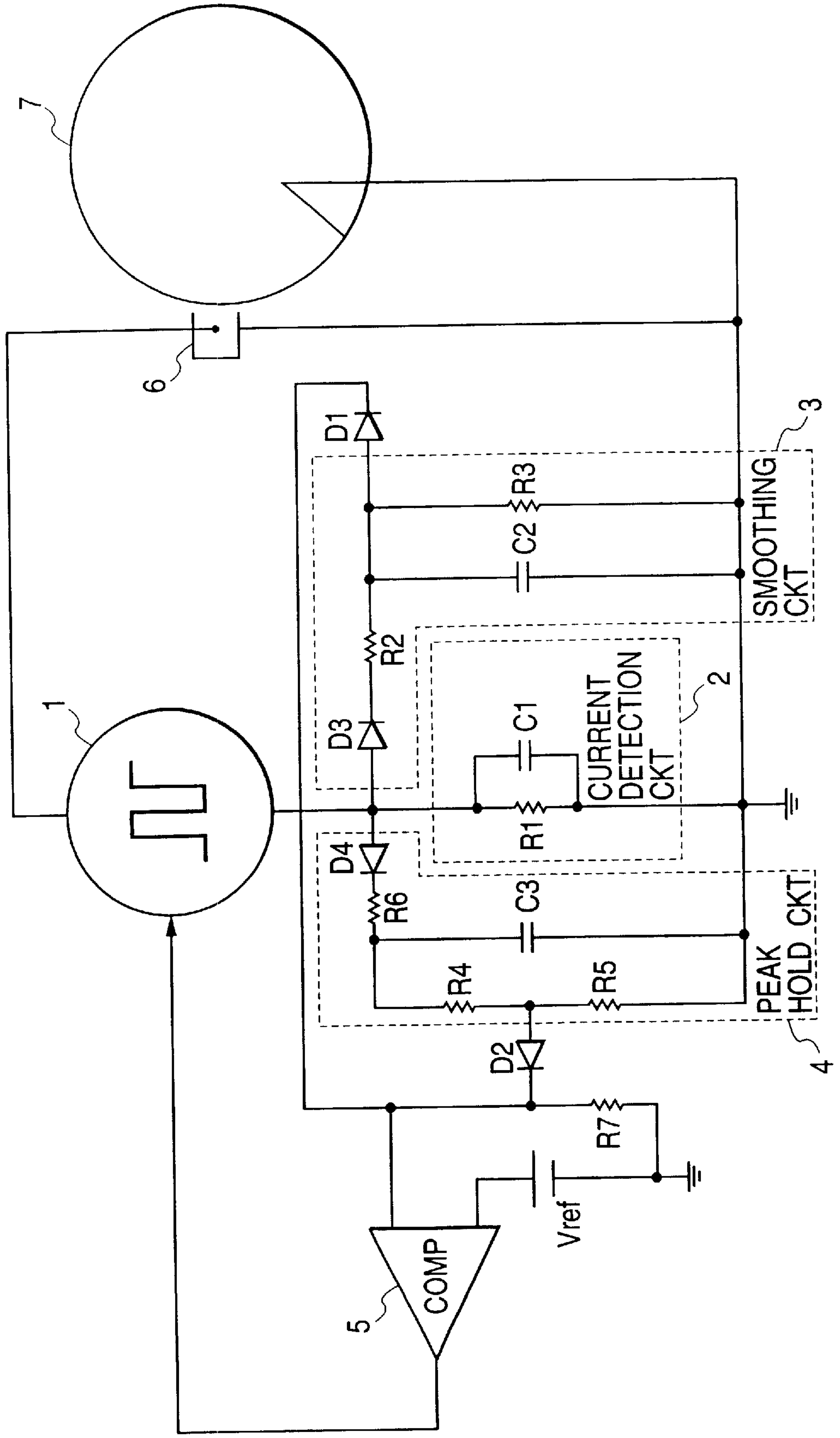
FIG. 2 is a circuit diagram showing the detailed configuration of the high voltage power supply apparatus mentioned above.

Now reference is made to FIG. 2 for explaining the detailed configuration of the high voltage power supply apparatus of the present embodiment, wherein the high voltage output circuit 1 is assumed to output a fixed AC high voltage.

Referring to FIG. 2, the current detection circuit 2 is composed of a resistor R1 and a capacitor C1. The resistor R1 is provided in a path in which all the output current passes, while the capacitor C1 is provided for bypassing the noise component of the current detected by conversion into a voltage by the resistor R1.

The smoothing circuit 3 is composed of a diode D3, resistors R2, R3 and a capacitor C2. The diode D3 executes half-wave rectification of the detection signal from the current detection signal 2 (detection signal being an AC signal in case the high voltage output circuit 1 outputs an AC voltage). The resistor R2 charges the capacitor C2 by delaying the leading edge of the current detection signal passed by the diode D3, based on the time constant in combination with the capacitor C2. Also the resistor R2 discharges the capacitor C2, storing the signal from the current detection circuit 2, based on the time constant in combination with the capacitor C2. Based on such charge-discharge circuit, the smoothing circuit 3 outputs an output voltage proportional to the effective value of the AC output current. In case the high voltage output circuit 1 outputs a DC current, the smoothing circuit 3 may be connected to the current detection circuit 2 without the diode D3, whereby the smoothing circuit 3 outputs a voltage proportional to the average current, insensitive to the small vibrations in the output of the high voltage output circuit 1.

The peak hold circuit 4 is composed of a diode D4, a capacitor C3 and resistors R4 to R6. The diode D4 charges the capacitor C3 with the peak voltage value of the output signal of the current detection circuit 2. The resistor R6 is provided for cutting off the noise component of the current detection signal, and may be dispensed with in case the noise component is absent. The level of such noise eliminating function is determined by the time constant with the capacitor C3, but the time constant has to be so determined as not to influence the peak holding function, for example in a range defined by:

$$R6 \cdot C3 < 10 \cdot R2 \cdot C2 \quad (1)$$

The resistors R4, R5 are provided for discharging peak voltage stored in the capacitor C3, and execute voltage division in order to lower the detected peak value to a suitable level.

In the above-described configuration, in case the output current increases in average by a decrease in the load impedance, the output signal of the smoothing circuit 3, namely the signal voltage corresponding to the effective value of the output current, becomes elevated, and, when it exceeds the reference voltage Vref, the output of the comparator 5 is inverted whereupon the high voltage output circuit 1 executes the protective function of lowering or terminating the output. Also in case the output current instantaneously increases by the leakage of the high voltage output, the peak voltage detection signal from the peak hold circuit 4 is elevated, and, when it exceeds the reference voltage Vref, the output of the comparator 5 is inverted whereupon the high voltage output circuit 1 executes the protective operation of lowering or terminating the output.

As explained in the foregoing, the high voltage power supply apparatus of the present embodiment is capable of securely executing the protective operation of lowering or terminating the output in response not only to an instantaneous increase in the output current resulting for example from a leakage to the photosensitive member but also to an averaged increase in the output current resulting for example from a deterioration in the impedance of the charger. It is thus rendered possible to minimize the damage to the process units caused for example by the increase in the current leakage in the charger or the current leakage to the photosensitive member, and to prevent such damage in combination with the ordinary maintenance operations, whereby the satisfactory image formation by the electrophotographic process can be maintained over a prolonged period.

[Second Embodiment]

In the following the second embodiment of the present invention will be explained with reference to FIGS. 3 and 4. At first there will be explained the configuration of the high voltage power supply apparatus of the present embodiment with reference to FIG. 3, wherein components the same as or equivalent to those in FIGS. 1 and 2 are represented by corresponding numbers and will not be explained further. In the following, only those portions which are different from the first embodiment will be explained.

Figure 3:
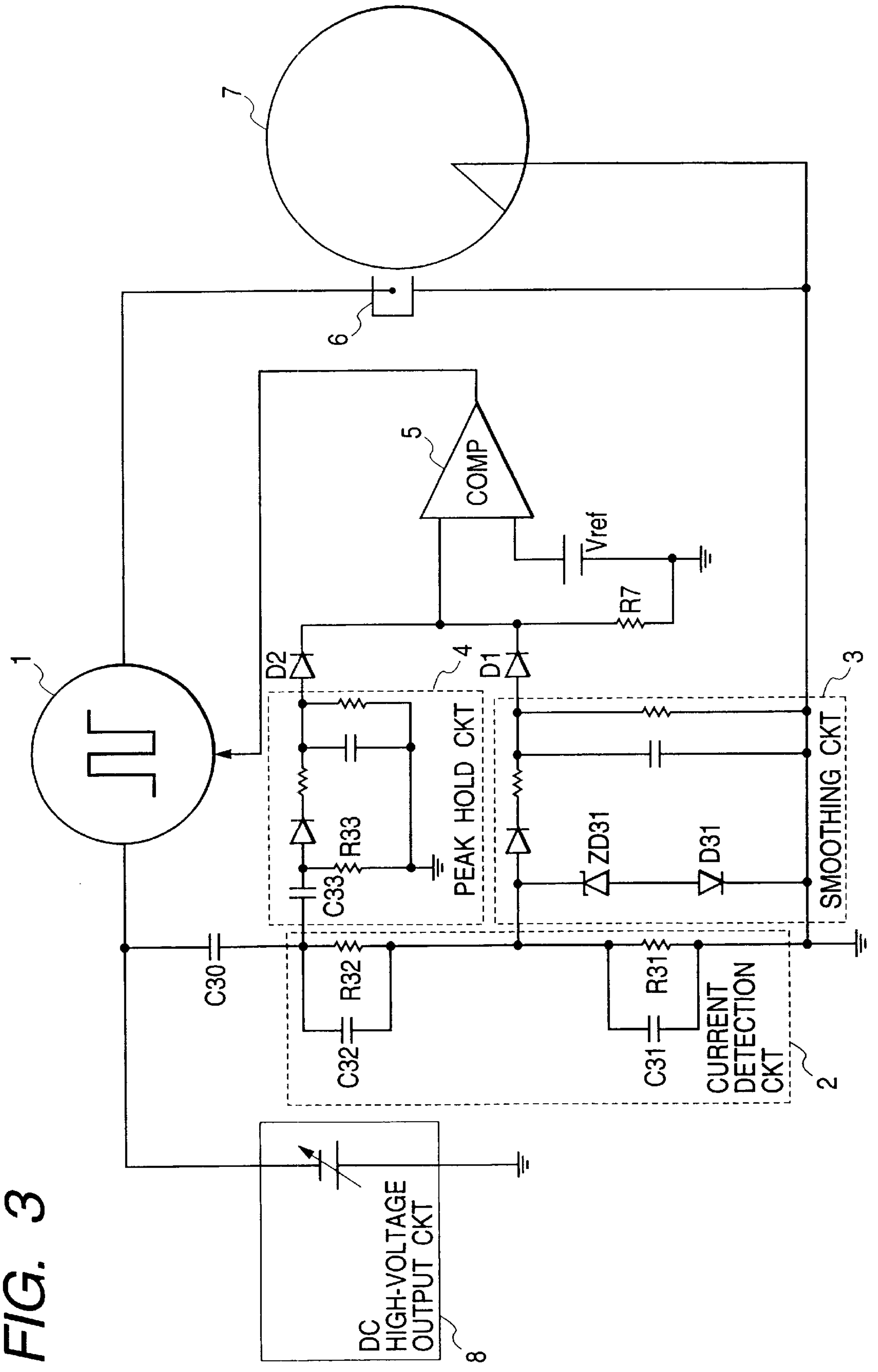
FIG. 3 is a circuit diagram showing the configuration of the high voltage power supply apparatus of a second embodiment.

In the high voltage power supply apparatus of the present embodiment shown in FIG. 3, the output of the high voltage output circuit 1 is composed of a DC voltage superposed with an AC voltage. For this purpose there are provided a DC high voltage output circuit 8 for outputting a DC high voltage, and a capacitor C30. The DC high voltage from the DC high voltage output circuit 8 is supplied to the high voltage output circuit 1, which superposes an AC voltage with such DC high voltage for generating the output voltage (constant voltage). The capacitor C30 is connected to the junction between the DC high voltage output circuit 8 and the high voltage output circuit 1, so as to connect the AC component outputted from the high voltage output circuit 1 to the ground through the current detection circuit 2.

The current detection circuit 2 is composed of a first current detection circuit, consisting of a resistor R31 and a capacitor C31 connected in parallel, and a second current detection circuit, consisting of a resistor R32 and a capacitor C32 connected in parallel. The resistors R31, R32 are provided for detecting the AC component of the output current of the high voltage output circuit 1 by conversion into a voltage. The capacitors C31, C32 are provided for cutting off the noise components of the currents detected by the resistors R31, R32 and for adjusting the sensitivity on frequency of the current detection by the resistors R31, R32. More specifically, the capacitor C32 is so selected as to provide sensitivity for the variation of a relatively high frequency in the leak current, while the capacity C31 is so selected as to provide sensitivity for the variation of a relatively low frequency in the AC component in the output current of the high voltage output circuit 1.

The smoothing circuit 3 is connected so as to smooth the output signal of the first current detection circuit consisting of the capacitor C31 and the resistor R31, but is additionally provided with a Zenar diode ZD31 and a diode D31 at the input side of the circuit of the first embodiment. These additional elements serve to limit, by the Zenar voltage, the voltage of the output signal of the first current detection circuit (current detection signal of a relatively low frequency), resulting from the on-off operation of the DC high voltage output circuit 8. It is possible to prevent erroneous detection of an increase in the output current, at the start or end of the DC high voltage at the above-mentioned on-off operation, as a current leakage or an increase in the effective value.

The peak hold circuit 4 is so connected as to hold the peak output signal of the second current detection circuit consisting of the capacitor C32 and the resistor R32, and a differentiating circuit consisting of a capacitor C33 and a resistor R33 connected at the input side of the circuit of the first embodiment in order to prevent the erroneous detection at the on-off operation of the DC high voltage and to provide sensitivity to the peak current resulting from the leakage.

In the following, there will be explained, with reference to FIG. 4, the function of the circuit consisting of the Zenar diode ZD31 and the diode D31 and provided at the input side of the smoothing circuit 3 and that of the differentiating circuit provided at the input side of the peak hold circuit 4.

Figure 4:
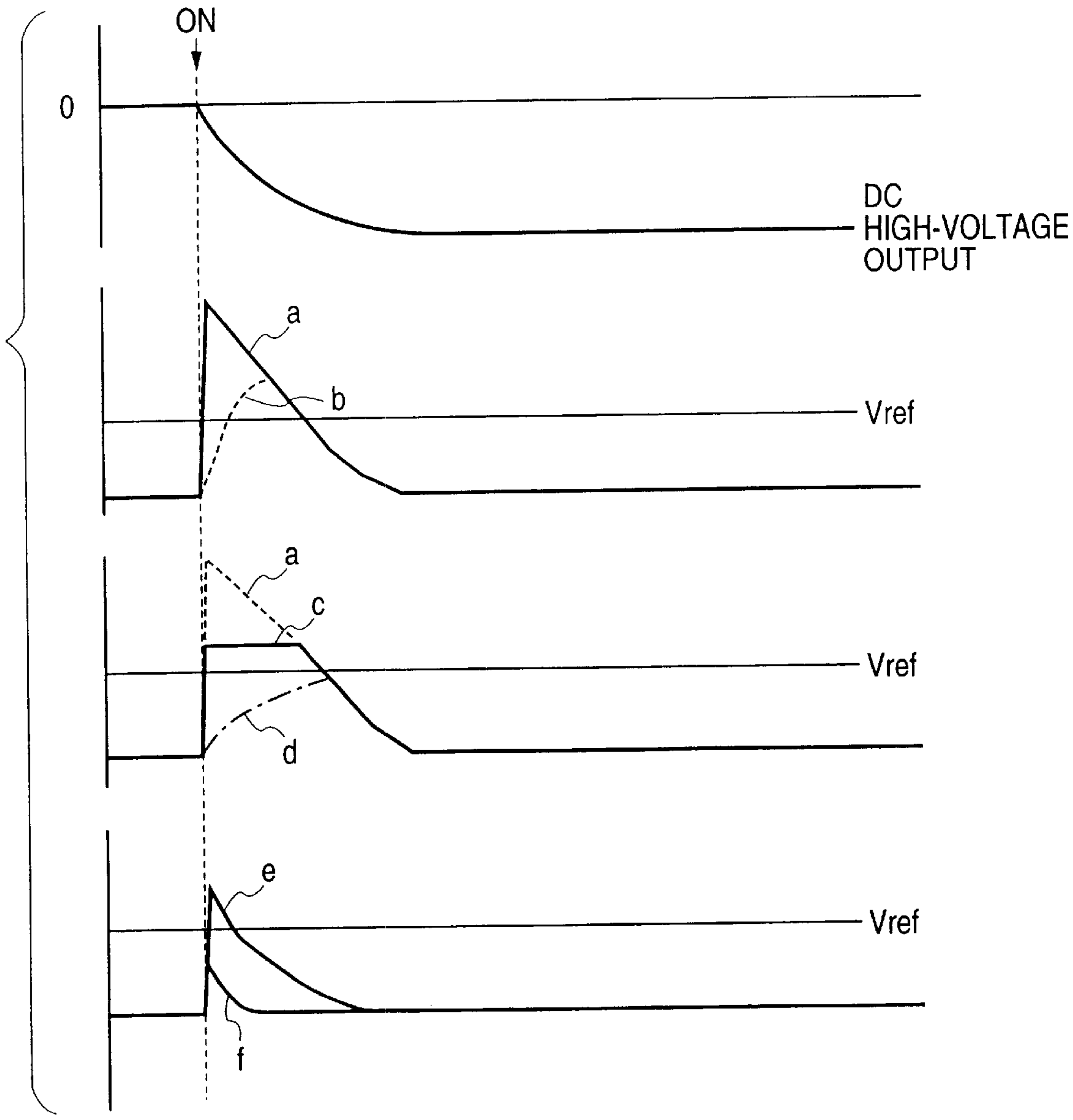
FIG. 4 is a wave form chart showing a current showing a current detection signal, a smoothed output, etc. for explaining the function of the above-mentioned high voltage power supply apparatus.

In FIG. 4, (a) indicates the current detection signal when the DC high voltage output circuit 8 is turned on in case the Zenar diode ZD31 and the diode D31 are not employed. Also (b) indicates the output obtained by smoothing the signal (a). As shown in these charts, by the influence of differentiation of the DC high voltage when the DC high voltage output circuit 8 is turned on, the smoothed output (b) exceeds the reference voltage Vref of the comparator 5, so that the effective current value is erroneously detected as excessively high, even if the output of the high voltage output circuit 1 is normal.

On the other hand, (c) indicates the current detection signal mentioned above in case the Zenar diode ZD31 and the diode D31 are added, and (d) indicates the corresponding smoothed output. In this case the smoothed output (d) does not exceed the reference voltage Vref, so that the erroneous detection of the effective current value does not occur.

Further, (e) indicates the output of the differentiating circuit in the peak hold circuit 4 in case the circuit consisting of the Zenar diode ZD31 and the diode D31 is not employed, while (f) indicates the corresponding output in case the above-mentioned circuit consisting of the Zenar diode ZD31 and the diode D31 is connected. As shown in these charts, in case with the circuit of the Zenar diode ZD31 and the diode D31, the leading upshift of the current detection signal is suppressed by the Zenar effect to correspondingly reduce the differentiated output whereby the reference voltage Vref of the comparator 5 is not exceeded and the erroneous detection as the current leakage does not occur.

The above-described configuration allows, even in case the DC high voltage is superposed with the AC high voltage and the DC high voltage is turned on and off, to exactly detect the averaged increase of the output current resulting from the lowered impedance of the load and the instantaneous increase resulting from the current leakage without erroneous detection, thus providing effects similar to those in the first embodiment.

In the foregoing first and second embodiments, the high voltage output circuit 1 is assumed to provide a constant voltage output, but it may also be designed to provide a constant current output.

Also there has been explained a configuration of comparing the output signals of the peak hold means and the smoothing means with the reference voltage Vref by the common comparator, but there may be provided a comparator for each signal and a reference voltage may be provided for each comparator.

As will be apparent from the foregoing, it is rendered possible to securely detect the instantaneous increase in the output current resulting for example from the leakage in the load and the averaged increase in the output current resulting for example from the deterioration in time of the load, thereby securely executing the protective operation such as lowering or terminating the output. In the use, for example, as the power source for the image forming apparatus such as an electrophotographic copying apparatus or printer, it is rendered possible to lower or terminate the voltage output by securely detecting the instantaneous increase in the output current resulting for example from the leakage to the photosensitive member and the averaged increase in the output current resulting for example form the deterioration in the charger, thereby preventing, in combination with the ordinary maintenance works, the damage in the process units such as the photosensitive member and maintaining the satisfactory image formation by the electrophotographic process over a long period. Particularly in case the AC voltage is superposed with the DC voltage as the output, the instantaneous increase and the averaged increase in the output current can be exactly detected while the change in the output current resulting from the on-off operation of the DC voltage is not erroneously detected as the instantaneous increase in the output current resulting for example from the leakage in the load and the averaged increase in the output current resulting for example from the deterioration in time of the load.

The present invention is not limited by the foregoing embodiments but is subject to various modifications within the scope and spirit of the appended claims.

What is claimed is:

1. A high voltage power supply apparatus that outputs a constant current or a constant voltage, comprising:

a high voltage output circuit for supplying a charger load with a high voltage AC;

a first detection circuit for detecting a variation of high frequency characteristics in the output current of said high voltage output circuit;

a second detection circuit for detecting a variation of low frequency characteristics in the output current of said high voltage output circuit; and a comparator circuit for comparing each of the outputs of said first and second detection circuits with a reference value and outputting a signal for lowering or terminating the output of said high voltage output circuit when the output of said first or second detection circuit exceeds the reference value.

2. A high voltage power supply apparatus according to claim 1, wherein said first detection circuit includes a circuit for detecting and holding the peak in the output of said high voltage output circuit.

3. A high voltage power supply apparatus according to claim 1, wherein said second detection circuit includes a circuit for smoothing the output of said high voltage output circuit.

4. A high voltage power supply apparatus according to claim 1, wherein said charger load is a charger of an electrophotographic image forming apparatus.

5. A high voltage power supply apparatus according to claim 1, wherein said high voltage output circuit provides a constant voltage output.

6. A high voltage power supply apparatus according to claim 1, wherein said high voltage output circuit provides a constant current output.

7. A high voltage power supply apparatus that outputs a constant current or a constant voltage, comprising:

a high voltage output circuit for supplying a charger load with a high voltage AC;

a current detection circuit for outputting a signal of a voltage proportional to the output current of said high voltage output circuit;

a smoothing circuit for smoothing the output of said current detection circuit;

a peak hold circuit for holding the peak of the output of said current detection circuit; and a comparator circuit for comparing the output of said current detection circuit with a reference value and outputting a signal for lowering or terminating the output of said high voltage output circuit when the output of said current detection circuit exceeds the reference value.

8. A high voltage power supply apparatus according to claim 7, wherein said current detection circuit includes a first current detection circuit having sensitivity to a current variation of a low frequency, and a second current detection circuit having sensitivity to a current variation of a high frequency, wherein said smoothing circuit is adapted to smooth the output of said first current detection circuit and said peak hold circuit is adapted to hold the peak in the output of said second current detection circuit.

9. A high voltage power supply apparatus according to claim 8, wherein said smoothing circuit includes a limiting circuit for limiting the voltage of the output signal of said current detection circuit.

10. A high voltage power supply apparatus according to claim 7, wherein said peak hold circuit includes a differentiating circuit for differentiating the output of said current detection circuit.

11. A high voltage power supply apparatus that outputs a constant current or a constant voltage, comprising:

a DC high voltage circuit for outputting a DC high voltage;

a high voltage output circuit for superposing an AC high voltage with the DC output of said DC high voltage circuit, for supply to a charger load;

a first detection circuit for detecting a variation of high frequency characteristics in the output current of said high voltage output circuit;

a second detection circuit for detecting a variation of low frequency characteristics in the output current of said high voltage output circuit; and a comparator circuit for comparing each of the outputs of said first and second detection circuits with the reference value and outputting a signal for lowering or terminating the output of said high voltage output circuit when the output of said first or second detection circuit exceed the reference value;

wherein said second detection circuit includes a limiting circuit for limiting the variation at the leading upshift in the DC output from said DC high voltage circuit.

12. A high voltage power supply apparatus according to claim 11, wherein said first detection circuit includes a circuit for detecting and holding the peak in the output of said high voltage output circuit.

13. A high voltage power supply apparatus according to claim 11, wherein said second detection circuit includes a circuit for smoothing the output of said high voltage output circuit.

14. A high voltage power supply apparatus comprising:

a high voltage output circuit for supplying a high constant voltage to a load;

a first detection circuit for detecting whether a peak current flowed to the load is abnormal with respect to the load;

a second detection circuit for detecting whether an average current flowed to the load is abnormal with respect to the load; and a controller for lowering or terminating the high constant voltage supplied by said high voltage output circuit when an abnormality is detected by said first detection circuit or by said second detection circuit.

15. A high voltage power supply apparatus according to claim 14, wherein said high voltage output circuit supplies a constant AC voltage.

16. A high voltage power supply apparatus according to claim 14, wherein said first detection circuit detects the abnormality in accordance with the peak current exceeding a predetermined current, and said second detection circuit detects the abnormality in accordance with the average current exceeding said predetermined current.

17. A high voltage power supply apparatus according to claim 14, wherein said first detection circuit detects the abnormality in accordance with the peak current exceeding a first predetermined current, and said second detection circuit detects the abnormality in accordance with the average current exceeding a second predetermined current.

18. A high voltage power supply apparatus that outputs constant current or a constant voltage, said apparatus comprising:

a high voltage output circuit for supplying a charger load with a high voltage;

a first detection circuit for detecting a variation of high frequency characteristics in the output current of said high voltage output circuit;

a second detection circuit for detecting a variation of low frequency characteristics in the output current of said high voltage output circuit; and a comparator circuit for comparing each of the outputs of said first and second detection circuits with a reference value and outputting a signal for lowering or terminating the output of said high voltage output circuit when the output of said first or second detection circuit exceeds the reference value.

19. A high voltage power supply apparatus that outputs constant current or a constant voltage, said apparatus comprising:

a high voltage output circuit for supplying a charger load with a high voltage;

a first detection circuit for detecting a variation of high frequency characteristics in the output current of said high voltage output circuit;

a second detection circuit for detecting a variation of low frequency characteristics in the output current of said high voltage output circuit;

a first comparator circuit for comparing the output of said first detection circuit with a first reference value and outputting a signal for lowering or terminating the output of said high voltage output circuit when the output of said first detection circuit exceeds the first reference value; and a second comparator circuit for comparing the output of said second detection circuit with a second reference value and outputting a signal for lowering or terminating the output of said high voltage output circuit when the output of said second detection circuit exceeds the second reference value.

* * * * *

UNITED STATES PATENT AND TRADEMARK OFFICE

CERTIFICATE OF CORRECTION

PATENT NO. : 6,515,841 B1

DATED : February 4, 2003

INVENTOR(S) : Koji Doi

It is certified that error appears in the above-identified patent and that said Letters Patent is hereby corrected as shown below:

Column 5,
Line 41, “case” should read -- a case --.
Line 46, “as” should read -- of --.

Column 6,
Line 11, “form” should read -- from --.

Column 7,
Line 49, “exceed” should read -- exceeds -- and “value;” should read -- value, --.

Signed and Sealed this

Twenty-third Day of September, 2003

JAMES E. ROGAN
*Director of the United States Patent and Trademark Office*